Oct. 15, 1929.　　　　M. R. WARE　　　　1,732,176

PROCESS AND APPARATUS FOR MAKING PAPER

Filed July 7, 1927　　　3 Sheets-Sheet 1

Melvin R. Ware
INVENTOR

BY Victor J. Evans
ATTORNEY

WITNESS: John Donovan

Oct. 15, 1929.  M. R. WARE  1,732,176
PROCESS AND APPARATUS FOR MAKING PAPER
Filed July 7, 1927  3 Sheets-Sheet 2

Fig. 2.

Melvin R. Ware
INVENTOR
BY Victor J. Evans
ATTORNEY

WITNESS John Donovan

Oct. 15, 1929.    M. R. WARE    1,732,176
PROCESS AND APPARATUS FOR MAKING PAPER
Filed July 7, 1927    3 Sheets-Sheet 3

Melvin R. Ware
INVENTOR

BY Victor J. Evans
ATTORNEY

WITNESS:

Patented Oct. 15, 1929

1,732,176

UNITED STATES PATENT OFFICE

MELVIN R. WARE, OF BALTIMORE, MARYLAND

PROCESS AND APPARATUS FOR MAKING PAPER

Application filed July 7, 1927. Serial No. 204,002.

The present invention relates to the process and apparatus used in the fabrication or felting of fibre into sheets in the process of making paper therefrom.

An important object of the invention is to provide a process and apparatus for substantially carrying out said process whereby paper of all kinds and grades may be felted better, more rapidly, and more economically than has been heretofore possible without any material change of construction of the apparatus.

A further object is the provision of means in a felting machine, whereby the felt may be dried sufficiently to go directly to the "driers" without the necessity of passing over long "draws" to presses and the like.

Other objects are compactness of the construction of the apparatus and elimination of parts necessary in machines now in use.

Another object is the elimination of damaging influences in the manufacture of the felt.

A still further object is to provide a construction whereby the speed of production may be increased without increasing the length of the endless belt.

A further object is the provision of means whereby the mounting of an endless belt or apron upon the machine may be facilitated.

A still further object is the provision of means whereby a vacuum effect at certain places in the construction may be varied.

Further objects and advantages will appear from the following specification and claims and I do not wish to be limited in the scope of my invention except as I shall be limited by said claims.

In the drawings:

Figure 2 is a plan view of the machine.

Fig. 5 is a section on line 5—5 of Fig. 1 loooking in the direction of the arrows, and illustrating the arrangement of the rollers for supporting the forward end of one of the deckle belts.

Figure 1:
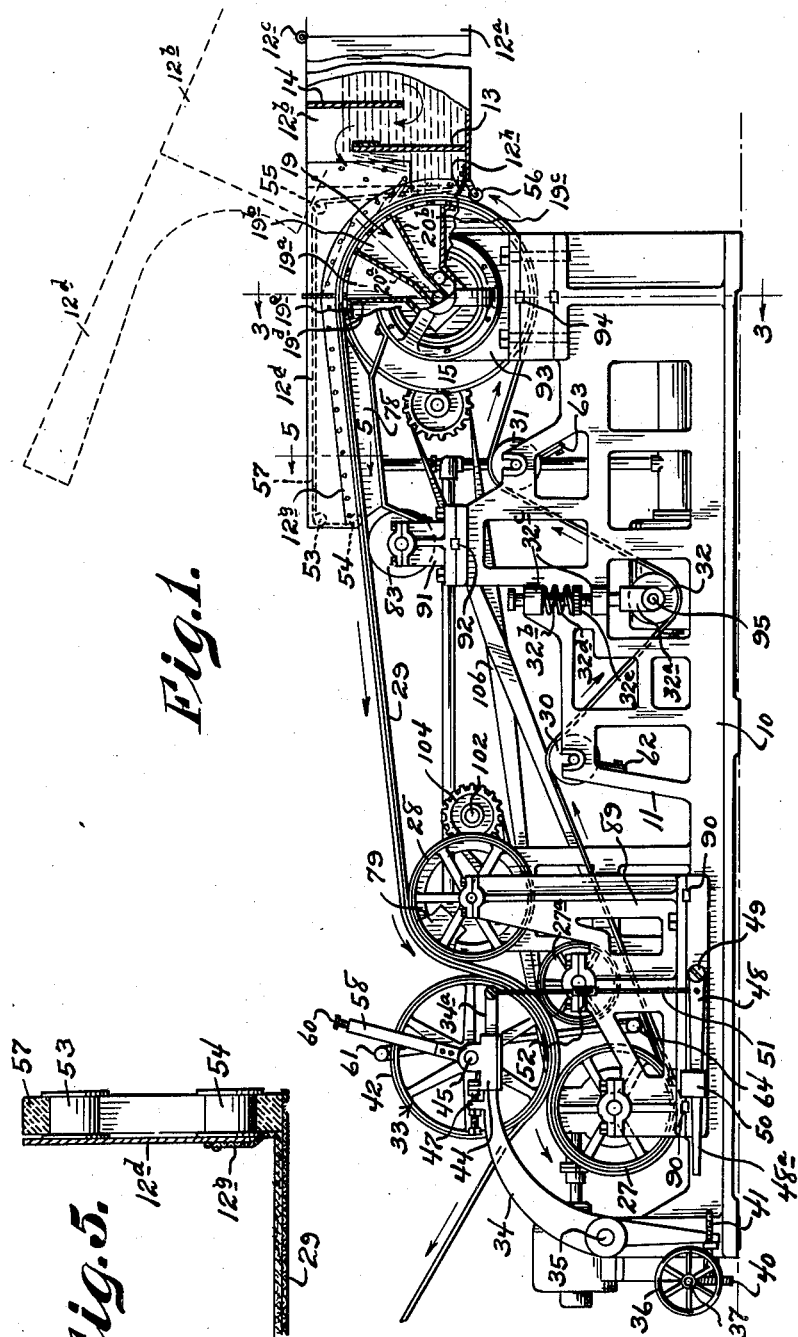
Figure 1 is a side elevation of the machine constituting the invention with parts broken away, showing the arrangement of vacuum boxes in the fabricating drum and also showing the internal arrangement of the stock vat and the relation of endless belt deckels to the endless conveyor belt.
Figure 3:
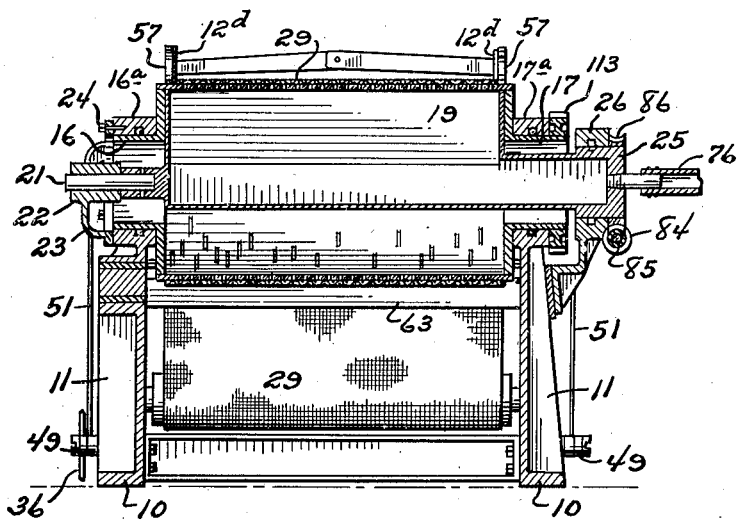
Figure 3 is a section on the line 3—3 of Figure 1, looking in the direction of the arrows and illustrating the arrangement of the vacuum boxes in the fabricating drum.
Figure 4:
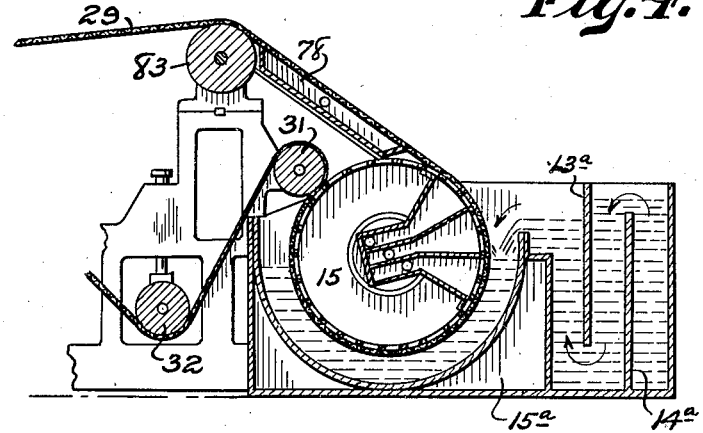
Figure 4 is a modified showing of a stock vat with the fabricating drum partly submerged therein.

Referring to the drawings in detail, the same reference characters designating the various parts throughout all figures of the drawings, 10 designates a base, preferably of cast iron or such usual materials as are employed for this purpose, upon which the framework 11 of the machine is mounted, which framework may be cast integral therewith as shown in the drawings. At one end of the machine, as shown in Figure 1, is a vat 12 made in two parts $12^a$ and $12^b$ hinged together at $12^c$, the latter part lying adjacent the fabricating drum and having extensions or side boards $12^d$ extending over the drum and extending a certain distance beyond the drum along the carrying endless belt to be described. The purpose of the hinged construction is to permit the portion of the vat $12^b$ and the side boards $12^d$ to be lifted off of the drum and folded back on the portion $12^a$ or suspended from a suitable support in case it is desired to remove the belt or for any other purpose. The vat or tank 12 is provided with the usual tortuous passageway around a plurality of baffles, two of which are illustrated at 13 and 14, extending from the top and the bottom of the vat respectively so that the stock may be delivered to the portion of the vat $12^b$, thoroughly agitated and of uniform mixture. The vat may be arranged with an open forward end so that the stock will flow onto a fabricating drum, to be described, from the side, as shown in Figure 1, or the drum may be submerged or partially submerged in the vat, as shown in Figure 4. The fabricating drum or roll 15 is suitably mounted for rotation by means of hollow trunnions 16 and 17 in journal boxes $16^a$ and $17^a$ respectively secured to the frame 11. The drum is of openwork construction preferably having slats 18 extending longitudinally of the drum and spaced apart about its periphery.

Mounted on the opposite end of the frame are a plurality of rolls 27, 27$^a$ and 28 which cooperate with the drum 15 to support an endless carrying belt or apron 29 of reticulate material and preferably consisting of a strip of closely woven wire cloth, either woven endless or spliced as may be desired, which endless belt is trained about the drum and is of sufficient length to pass around rolls 27 and 28 over rolls 30 and 31 and under the tensioning roll 32 lying between rolls 30 and 31. The roll 32 is journaled in brackets 32$^a$ at the ends of screws 32$^b$ which are provided one on each side of the machine mounted in ears 32$^c$ extending from the sides of the frame. Encircling these screws are compression springs 32$^d$ having their ends respectively abutting against ears 32$^c$ and nuts 32$^e$. Adjacent the rolls 27, 27$^a$ and 28 is provided a roll 33 mounted upon arms 34$^a$ of the levers 34. The levers 34 are pivoted to the frame 11 intermediate of their ends at 35 and may be adjusted to position roll 33 relative to rolls 27 and 27$^a$ so that the desired pressure may be exerted on the fibrous web between said rolls, by means of shafts 41 journaled to the frame 11 and having threaded connection with the ends of arms 34$^b$ of the levers 34; shafts 41 being operated by means of hand wheel 36 and worms 38 on shaft 37 meshing with worm wheels 40 on shafts 41. The roll 33 may be covered with a woolen jacket 42 to prevent slipping of the fibre web, which jacket is preferably shrunk thereon and made fast at the ends. The roll 33 is of larger diameter than the rolls 27 and 28 and is designed to rest on the upper surface of the belt between said rolls. Roll 33 is provided with trunnions 45 which are rotatably mounted in journal boxes 44 slidably mounted on the lever arms 34$^a$, the journal boxes 44 being adjustably held on the said arms by means of screw bolts 46 rotatably connected with the journal boxes and having threaded connection with lugs 47 projecting from the lever arms. The purpose of this roll 33 is to cooperate with the rolls 27, 27$^a$ and 28 in order to exert pressure on the web of felt fibres resting on the upper surface of the belt 29 and in order that the pressure exerted may be varied the outer ends of the lever arms 34$^a$ are connected, by rods 51 having turn buckles 52 thereon, with levers 48 pivoted to the frame at 49 and having weights 50 slidably adjusted along their arms 48$^a$.

The side walls 12$^c$ of the portion 12$^b$ of the vat 12 adjacent the drum 15 are spaced apart a distance equal to the width of the endless belt 29 and the side boards 12$^d$ are so attached thereto as to form no pockets in the tank where eddies may occur or dead, stagnant water may collect, giving rise to froth or foam and to slime. Secured to the lower edge of the side boards are aprons in the form of strips of cloth or flexible metal 12$^g$, the lower edges of which are slightly spaced from the endless belt. The purpose of these aprons is to break the joint between the side board and the deckel. The rolls 56 lie below the bottom of the tank in order to cause the rubber deckel to contact with the endless belt 29 ahead of the point where the stock is fed thereto and in order to prevent stock and water from spilling out of the vat under the drum an apron 12$^h$ is secured along the edge thereof adjacent the drum and extends a sufficient distance therefrom to make a firm contact with said belt 29 on said drum.

Mounted upon the side boards and on the outside surface thereof are rolls 53, 54, 55 and 56 about which are trained rubber belts or aprons 57 which act as deckels, the lower surfaces of which are adapted to conform at the sides thereof with the belt 29 as it passes around the upper surface of the drum 15 and to press against the edge of the fibre deposited on said belt 29. These rubber deckels are extended forwardly of the drum 15 to the forward edge of the side boards, as will be seen by reference to Figure 1, for their movement about the rolls 53, 54, 55 and 56 upon frictional contact with the wire cloth belt 29. The purpose of these rubber deckels is to give a uniform edge to the web of fibre.

Doctors for cleaning the various rolls which contact with the surface of the fibrous web or with the side of the belt with which said web has contacted are provided in connection with said rolls. A doctor 58 having a wooden doctor blade 58$^a$ contacting with the surface of the roll 33 is provided, which is supported by a suitable frame 59 and connected therewith by adjustment screws 60, the frame 59 being supported by journal boxes 44. This blade may be supplemented in its cleaning action by a shower pipe 61 extending transversely of the machine adjacent the roll 33 and adapted to sprinkle water thereupon. In connection with rolls 30 and 31 are provided doctors 62 and 63 which carry rubber doctor blades for scraping any fibre from said rolls which may have been deposited thereon by the belt 29. For assisting in cleaning the belt 29 and salvaging the fibre adhering thereto after the web has been taken off, a shower pipe 64 is extended transversely of the machine above the lower reach of the belt adjacent the roll 27, which shower pipe is adapted to sprinkle water on the belt as it passes that point, washing any adhering fibre off into collecting receptacles of well-known character, not shown.

Mounted within the drum 15 and arranged for angular adjustment relative thereto is a vacuum box 19 having walls 19$^d$ and a plurality of compartments 19$^a$, 19$^b$ and 19$^c$ separated by partitions 20$^a$ and 20$^b$, said vacuum box being supported at one end by means of the trunnion 21 rotatably mounted in a journal box 22 formed integral with the supporting structure 23 which may be attached to the journal box 16ª in which the trunnion 16 is mounted by any suitable means as by screw bolts 24. At the opposite end of the vacuum box is provided a hollow shaft 25 which is journaled in the bracket 26 secured to the frame 11. The partitions 20ª and 20ᵇ extend into and partition this hollow shaft 25 whereby each compartment of the vacuum box may be connected separately with a vacuum pump as hereinafter described. The walls 19ᵈ are provided at the edges with flanges 19ᵉ of sufficient width to connect with slats adjacent the said walls 19ᵈ when the said walls happen to fall between said slats and to prevent suction being exerted except through the cylindrical surface of said drum.

Connected with the compartments 19ª, 19ᵇ and 19ᶜ through the extensions thereof in the hollow shaft 25, are a plurality of feed pipes 65, 66 and 67 which connect through a manifold 68 and pipe 69 with a suction device, as a vacuum pump 70, of any desired construction, the suction through the pipes 65, 66 and 67 being controlled by valves 71, 72 and 73. The respective compartment extensions have short lengths of pipe 65ª, 66ª, and 67ª extending therefrom which connect with pipes 65, 66 and 67 by means of a length of flexible hose 75, 76 and 77, which construction permits of the angular adjustment of the vacuum box described above. The purpose of the vacuum box 19 is to suck the water in the vat 12 through the mesh of the endless belt 29 leaving the fibre contained therein deposited upon the endless belt 29. The suction exerted through the vacuum box also partially dries the fibrous web. Other vacuum boxes along the course of travel of the belt are provided for further drying the web, as for example at 78 and 79, which boxes are likewise connected with the suction device 70 by means of pipes 80 and 81 controlled by the valve 82. The adjustment of the vacuum boxes 19, 20 and 21 may be accomplished through a worm 84 mounted on the shaft 85 meshing with the worm wheel 86 on the end of the hollow shaft 25 and the hand wheel 87 on the other end of the shaft 85, said shaft 85 being mounted in a bracket 88 secured to the frame 11.

A supporting or guide roll 83 may be provided on the frame at any suitable point for supporting the weight of the upper strand of the belt 29 and guiding it as it passes from the drum 15 laden with the fibre web to the rolls 27 and 28.

Inasmuch as belts of wire cloth such as the belt 29 are very heavy and difficult to place upon the drum and rolls, provision is made for removing the rolls 27, 27ª and 28 with their integral supporting structure 89 which is so connected with the base of the frame 10 that it may be detached therefrom by sliding it sidewise on tracks 90. The supports 91 and 93 of roll 83 and drum 15 respectively on one side of the machine are removable, leaving the drum and roll suspended in place, said supports 91 and 93 being slidable transversely of the machine on tracks 92 and 94 respectively. The tension roll 32 is likewise detachable by removing the shaft 95 on which it is mounted from its bearings 96.

The various rotatable parts of the machine are power-driven through a motor 97 or any other suitable means connected with the shaft 98 on which the roll 27 is secured for rotation therewith, the roll 28 being driven from said shaft 90 through cross belt 99 trained over cone pulleys 100 and 101, the latter being secured to a stub shaft 102 journaled in a suitable bearing 103 on the frame of the machine, the opposite end of said stub shaft being provided with a gear 104 meshing with a gear 105 on the end of the roll 28. The drum 15 is similarly driven through cross belt 106 trained about cone pulleys 107 and 108 respectively on shafts 98 and 109, the shaft 109 being mounted in bearings 110 and 111 and having a gear 112 secured thereon and meshing with a similar gear 113 on the end of the cylinder 15.

In the modified arrangement of the fabricating drum 15 shown in Figure 4 the walls 13ª and 14ª are shown in reverse relation to that shown in Figure 1 and the drum is partly submerged in a trough 15ª and there is a slightly different position of tension roll 32.

The operation of the machine is as follows:

The fibrous pulp after being screened in the usual manner travels through suitable pipes, not shown and not part of this invention, to the vat 12 being agitated and brought to a uniform mixture by passing around baffles 13 and 14, arriving finally in the compartment adjacent the drum 15. The pulp will deposit on the belt 29 partially by gravity, the water passing through the mesh thereof, and partially by suction exerted thereon through the vacuum compartments 19ª, 19ᵇ, 19ᶜ suitably adjusted to the inner surface of the drum. The vacuum pressure in said compartments is regulated individually by their respective valves 71, 72 and 73. As an alternative to the above process, pulp may be deposited on the belt 29 at the center level or above by means of vacuum only as in the vat illustrated in Figure 4. As the belt 29 passes upwardly over the drum 15, the rubber deckel belts 57 will eliminate the rough edges, giving the desired deckeled edge to the web of pulp fibre.

As the pulp is carried onward by the belt 29, it passes over vacuum box 78 which extracts additional water therefrom, thence over the roll 28, which may be called the vacuum roll, where there is further extraction of water by suction through the vacuum box 79. The belt then passes between rolls 28, 27ª and 27 on the under surface thereof and the jacketed roll 33 on the upper surface, the latter being adjusted to the pressure and location relative to said rolls 27, 27ª and 28 necessary to produce the desired effect on the web of fiber pulp. In passing between these rolls still more water is pressed out and the web may be guided off of the roll 27 which may be known as the drive roll, as indicated at 114, and may go direct to driers or be passed between a series of presses or the like, constituting no part of this invention and therefore not shown or described.

The endless belt 29 of course continues around the driving roll 27 and under the shower at 64, where the belt is almost completely cleaned of any fibre adhering thereto. From thence the belt passes over and under the guide rolls 30, 32 and 31. The belt is further cleaned of any fibre that may still adhere thereto by the rubber doctor blades 62 and 63 adjacent the respective rolls 30 and 31. The white water containing the fibre scraped or washed from the belt 29 is caught in the usual manner and directed to a salvaging plant.

In passing off of the vacuum roll 28 it will be noted that the web of fibre contacts with the jacketed roll 33 several inches ahead of the point where the pressure roll 27ª contacts with the underside of the belt 29, which arrangement prevents crushing or slipping of the web. Likewise, the contact of the jacketed roll with the web will prevent slipping of the web between the pressure roll 27ª and the driving roll 27 and will prevent slipping of the web or crushing thereof when the pressure of the jacketed roll 33 is applied to the driving roll 27.

By the above construction it is possible by suitable adjustment of the vacuum box and of the jacketed roll 33, and by proper manipulation of the valves 71, 72 and 73 to manufacture any paper from tissue to paper board and all grades thereof made by paper machines now on the market, without any material changes, as roofing and flooring felts, blotting paper, tissue paper, print paper, kraft and bag paper, book paper, etc., the single exception being vat lined paper which may be also manufactured by the provision of suitable supplemental devices. Because of the more rapid drying due to the vacuum boxes it is possible to carry out the process with a shorter carrying belt for the fibre web and at a greater speed than in machines now in use, and the pressing given the web between rolls 33 and 27, 27ª and 28 eliminates the necessity of further pressing except where a high finish is desired. Further, the sheet will tend to retain its original elasticity better as in the case of test board and the fibres are more firmly bound together, when the web is pressed between rollers while somewhat moist as in the above process, than when pressure is applied after the sheets have become almost entirely dry.

Less sulphite will be required in the manufacture of print paper and all grades requiring sulphite to be used in high speed presses due to the nature of the machine which permits longer fibres to be fed to this machine, which dry much faster than short fibre and add strength to the sheet.

Proper regulation of the vacuum box also eliminates the necessity of manufacturing certain grades of paper and paper board in plies, which does away with flaws, splitting, ragged edges, crushing, checking, deckel troubles, overloading of the cylinders, stopping up of stuff gates, variation of weight and waste. The rapidity of production possible with this machine prevents the water in the vat from becoming frothy and slimy and consequently avoids production of slime spots on the paper and avoids thin and thick streaks.

Further economy is effected in reclamation of waste pulp in that it is possible in a machine of this kind to use pulp having a lower water content, about 70% as against 95% in the usual machines.

Having described the invention what I claim is:

1. In a machine of the character described having a base, a plurality of rolls mounted on said base in spaced relation to each other, an endless belt trained about certain of said rolls and under and above certain others, the support at one side of the rolls about which the belt is trained being removable, and a vat adapted to deliver fibre onto the endless belt.

2. In a machine for felting fibres into a web, a drum and a plurality of rolls in spaced relation to said drum, said machine having a base, a foraminous endless belt trained about said drum and rolls, a pressure roll resting on said belt between two of said rolls and adjustable between them, means for varying the pressure exerted by said pressure roll, an adjustable suction device in said drum, suction devices located along the belt, and means for varying the suction in said adjustable suction device.

3. In a paper machine, a fabricating drum, a stock vat, a rear portion and a forward portion, said forward portion lying adjacent said drum and having side boards extending over the drum, said forward portion being hinged to said rear portion.

4. In a paper machine, a fabricating drum, a roll spaced therefrom, an endless belt trained about said drum and roll, a tank adjacent said drum, side boards projecting from said tank along the sides of said belt, over and to a point along the belt forwardly of said drum, rolls on the outside surfaces of said side boards, and deckel belts trained about said rolls and contacting with the edges of said belt from a point below the bottom of said tank to the end of said side boards.

5. In a paper machine, a fabricating drum, a roll spaced therefrom, an endless foraminous belt trained about said drum and roll, a vat adjacent said drum, said drum and belt constituting its forward wall, an apron on the bottom of said tank contacting with said endless belt, and deckel belts trained over the edges of said belt from a point below the bottom of said vat to a point forwardly of said drum.

6. In a paper making machine, a fabricating drum, a roll spaced therefrom, an endless foraminous belt passing around the drum and roll, a vat having one end open with a portion of the drum and belt closing said open end and deckel belts trained over the edges of the foraminous belt and extending from a point below the bottom of the vat to a point forwardly of the drum.

7. In a paper making machine, a fabricating drum, a roll spaced therefrom, a foraminous belt passing over said drum and roll, a vat adjacent said drum and having its forward end closed by said drum and belt, side boards projecting from said vat along the sides of the belt, over and to a point along the belt forwardly of the drum, rollers on the outside surfaces of said side boards and on the side surfaces of the forward part of the vat, a pair of these rollers being located adjacent the bottom of the vat, deckel belts trained about said rollers and contacting with the edges of the belt, said deckel belts forming continuations of the inner walls of the vat so that the space between the deckel belts is of the same width as the vat.

8. In a paper making machine, a drum, a suction device therein, a roll spaced from the drum, a foraminous belt passing around the drum and roll, a second roll spaced from the first roll and with the top of which the belt contacts, a pressure roll arranged above the first mentioned rolls and pressing the belt and the sheet thereon between itself and portions of said first mentioned rolls, means for adjusting the position of said third roll relative to the other two rolls and a vat for delivering stock to the drum and the belt thereon.

9. In a paper making machine, a drum, a suction device therein, a roll spaced from the drum, a foraminous belt passing around the drum and roll, a second roll spaced from the first roll and with the top of which the belt contacts, a pressure roll arranged above the first mentioned rolls and pressing the belt and the sheet thereon between itself and portions of said first mentioned rolls, means for adjusting the position of said third roll relative to the other two rolls, a vat for delivering stock to the drum and the belt thereon, and means for varying the pressure exerted by said third roll on the belt.

10. In a paper making machine, a drum, a suction device therein, a roll spaced from the drum, a foraminous belt passing around the drum and roll, a second roll spaced from the first roll and with the top of which the belt contacts, a pressure roll arranged above the first mentioned rolls and pressing the belt and the sheet thereon between itself and portions of said first mentioned rolls, means for adjusting the position of said third roll relative to the other two rolls, a vat for delivering stock to the drum and the belt thereon, means for varying the pressure exerted by said third roll on the belt, and a suction roll rearwardly spaced from the third roll and above the plane of the first and second rolls so that the belt with the sheet thereon must descend from the suction roll into contact with the third roll and then pass over the first and second rolls.

11. In a paper making machine, a drum, a plurality of rolls in spaced relation to said drum, a foraminous endless belt trained about said drum and rolls, a pressure roll resting on said belt between two of said rolls and adjustable between them, means for varying the pressure exerted by said pressure roll, a suction device in said drum, a vat having an open end which is closed by a portion of the drum and the belt, side boards projecting from said vat along the sides of said belt, over and to a point along the belt forwardly of said drum and deckel belts trained over the edges of said belt from a point adjacent the bottom of the tank to a point forwardly of said drum, said deckel belts and the side boards forming continuations of the inner walls of the vat.

In testimony thereof I affix my signature.
MELVIN R. WARE.